US007243259B2

(12) United States Patent  
Kim

(10) Patent No.: US 7,243,259 B2  
(45) Date of Patent: Jul. 10, 2007

(54) SYSTEM COMBINED WITH LOADSHARING STRUCTURE AND PRIMARY/BACKUP STRUCTURE

(75) Inventor: Byeong-Chul Kim, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 565 days.

(21) Appl. No.: 10/663,844

(22) Filed: Sep. 17, 2003

(65) Prior Publication Data

US 2004/0073835 A1 Apr. 15, 2004

(30) Foreign Application Priority Data

Oct. 15, 2002 (KR) ............ 10-2002-0062842

(51) Int. Cl.
*G06F 11/16* (2006.01)
*G06F 11/00* (2006.01)

(52) U.S. Cl. ............... 714/13; 714/10; 714/11
(58) Field of Classification Search ............ None
See application file for complete search history.

(56) References Cited

U.S. PATENT DOCUMENTS 5,878,205 A * 3/1999 Greenstein et al. ......... 714/11
5,892,946 A * 4/1999 Woster et al. ............ 719/316
6,216,236 B1 * 4/2001 Miyao et al. .............. 714/11
6,694,450 B1 * 2/2004 Kidder et al. ............. 714/15

OTHER PUBLICATIONS

Middleware from Wikipedia version from Jun. 15, 2002 http://en.wikipedia.org/w/index.php?title=Middleware&oldid=494408&printable=yes.*
Decentralized Load Balancing Algorithm for Dynamic Computer Networks IBM Technical Disclosure Bulletin, Dec. 1991, US TDB-ACC-No: NA9112221.*

* cited by examiner

*Primary Examiner*—Scott Baderman
*Assistant Examiner*—Joseph Schell
(74) *Attorney, Agent, or Firm*—Robert E. Bushnell, Esq.

(57) ABSTRACT

A system having both load sharing structure and a primary/backup structure. The system has a primary unit mounted on each sub-system to share load according to load sharing processing order for events, a backup unit mounted on each sub-system to receive and store minimum data only necessary for restoration from the primary unit, the data is stored in the backup unit of a predetermined sub-system, a configuration management unit, a distributed algorithm processing unit, a shared resource, an event, and a distributed control environment.

20 Claims, 5 Drawing Sheets

SYSTEM COMBINED WITH LOADSHARING STRUCTURE AND PRIMARY/BACKUP STRUCTURE

CLAIM OF PRIORITY

This application claims priority to an application entitled "SYSTEM COMBINED WITH LOADSHARING STRUCTURE AND PRIMARY/BACKUP STRUCTURE", filed in the Korean Intellectual Property Office on Oct. 15, 2002 and assigned Serial No. 2002-62842, the contents of which are hereby incorporated by reference.

BACKGROUND OF THE INVENTION

1. Field of the Invention

The present invention relates to a distributed control system, and more particularly, to a system combined with a load sharing structure and a primary/backup structure for efficiently and stably operating the system.

2. Description of the Related Art

Generally, systems for distributively controlling many physically-distributed systems are divided into either a dual system (hereinafter, primary/backup structure) or a load sharing system. Systems that are primary/backup systems have resources and measures in place when a primary unit malfunctions. If a primary unit malfunctions in a primary/backup structure, the system can complete the processing of an event by using a backup unit. In such primary/backup systems, the backup unit contains all the information (is a duplicate) of the primary unit.

Systems that are load sharing have a plurality of units that can process events. The work in processing the events is distributed among the units so that to alleviate congestion that would result if only one unit is used.

However, primary/backup systems are inefficient because every piece of data must be duplicated into the backup unit. This requires a lot of overhead and resources to duplicate everything. Load sharing systems do not have primary/backup capabilities and systems with primary/backup capabilities do not have load sharing capabilities.

The above problems will be described as follows. The primary/backup structure does not have an efficient load sharing system and does not use all available system resources, thereby causing a waste of resources and deteriorating system efficiency. The primary/backup structure must be always increased in pairs, one for the primary unit and the other for the backup unit, causing an increase of cost.

The load sharing structure is advantageous in that it uses system resources efficiently by distributing processing of events in a uniform way among the units or sub-systems. However, this advantage is realized only when all systems are normally operated. If a certain system malfunctions in a load sharing structure, it becomes impossible to continue processing events in the down system, and furthermore, shared data occupied to be used cannot be restored. As a result, the load sharing system becomes unreliable because the load sharing system lacks backup and restoration capabilities.

SUMMARY OF THE INVENTION

It is therefore an object to provide an improved distributed control system.

It is another object of the present invention to provide a distributed control system with improved system capacity while reducing or eliminating waste of resources.

It is also an object of the present invention to provide a distributed control system that has both primary/backup capabilities and load sharing capabilities in a single system.

It is also an object of the present invention to provide a distributed control system with a combined load sharing structure and a primary/backup structure, where only data necessary for restoring shared resources and event processing is duplicated, reducing the resources for backup and thus achieving a more stable and efficient system.

These and other object may be achieved by a system having many sub-systems, each sub-system having a primary unit to share the event processing load according to load sharing processing order for events. Each sub-system also has a backup unit to receive and store as little data as necessary for restoration of a primary unit, the data being stored in the backup unit of a predetermined sub-system. The system further has a configuration management unit designating which backup unit is for each primary unit as well as managing which backup unit is for which primary unit. The system further has a distributed algorithm processing unit determining which sub-system processes events when the events are generated. The system also has a shared resource which is a resource accessible, shared and used by each sub-system and occupied in a primary units, the shared resource manages the processing of generated events. The system further includes a distributed control environment composed of a middleware platform enabling distributed processing among each sub-system, the configuration management unit, the distributed algorithm processing unit, and the shared resource.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
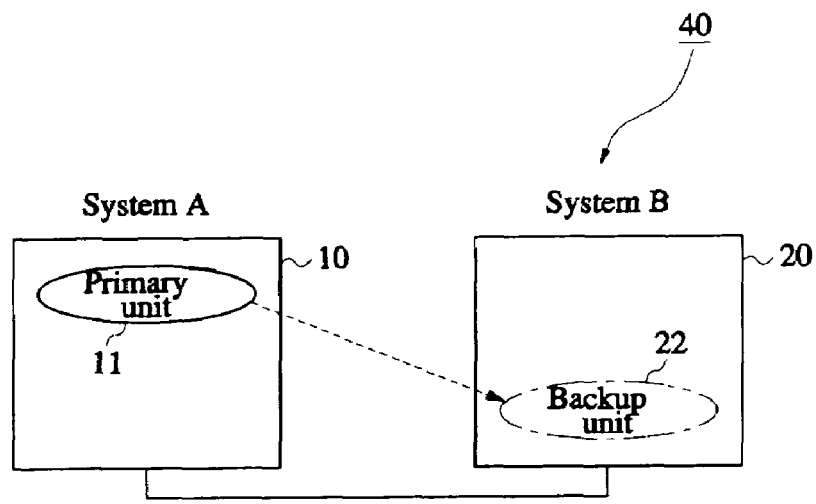
FIG. 1A is a conceptual diagram illustrating a distributed control system with a primary/backup structure between different sub-systems.
Figure 1B:
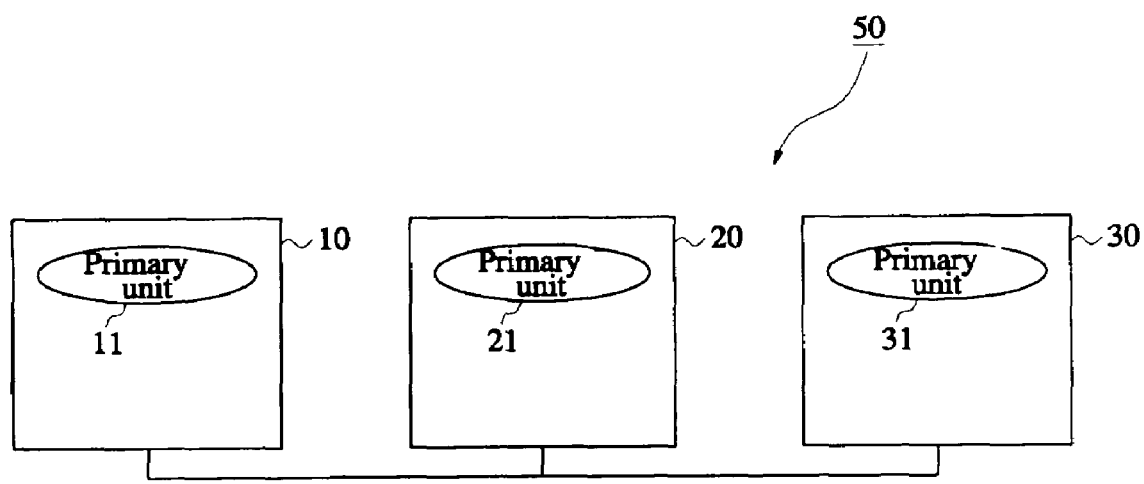
FIG. 1B is a conceptual diagram illustrating a distributed control system with a load sharing structure between different sub-systems.

Turning to the figures, FIG. 1A is a conceptual diagram illustrating a distributed control system 40 with a primary/ backup structure between different sub-systems within the distributed control system, and FIG. 1B is a conceptual diagram illustrating a distributed control system 50 with a load sharing structure between different sub-systems in the distributed control system. Referring to FIG. 1A, the primary/backup structure performs event processing by primary unit 11 in sub-system 10 and duplicating the contents of primary unit 11 into backup unit 22 in sub-system 20. If primary unit 11 should happen to malfunction, backup unit 22 will finish processing the event since backup unit 22 contains all the information of primary unit 11 prior to the malfunction.

Thus, data of primary unit 11 and backup unit 22 are identical. If primary unit 11 malfunctions, backup unit 22 takes over and becomes a new primary unit and processes the events waiting to be processed by primary unit 11, thus continuing normal operation on the processing of the events. However, in the primary/backup structure of FIG. 1A, primary unit 11 always processes all events regardless of the amount of the events waiting to be processed, and the sub-system 20 and backup unit 22 sits by idly in a standby mode while continually duplicating data pertaining to processed events found in primary unit 11. In FIG. 1A, because no resources other than primary unit 11 processes events, the distributed control system 40 of FIG. 1A can become bottlenecked and congested as no other resources are dedicated to processing the events. Meanwhile, backup unit 22 is a large resource that duplicates primary unit 11 but does not help in alleviating the bottleneck, resulting in wasted resources unless and until primary unit 11 malfunctions.

Turning to FIG. 1B, FIG. 1B illustrates a load sharing distributed control system 50 that uniformly distributes the work load among three primary units so that there is no longer the bottleneck problem of FIG. 1A. In the load sharing system of FIG. 1B, all three primary units 11, 22 and 31 work together to process events. Since all three sub-systems 10, 20 and 30 contain only primary units with no backup units, when one or more of the primary units malfunctions, it becomes impossible to continue and complete the processing of events.

Figure 2A:
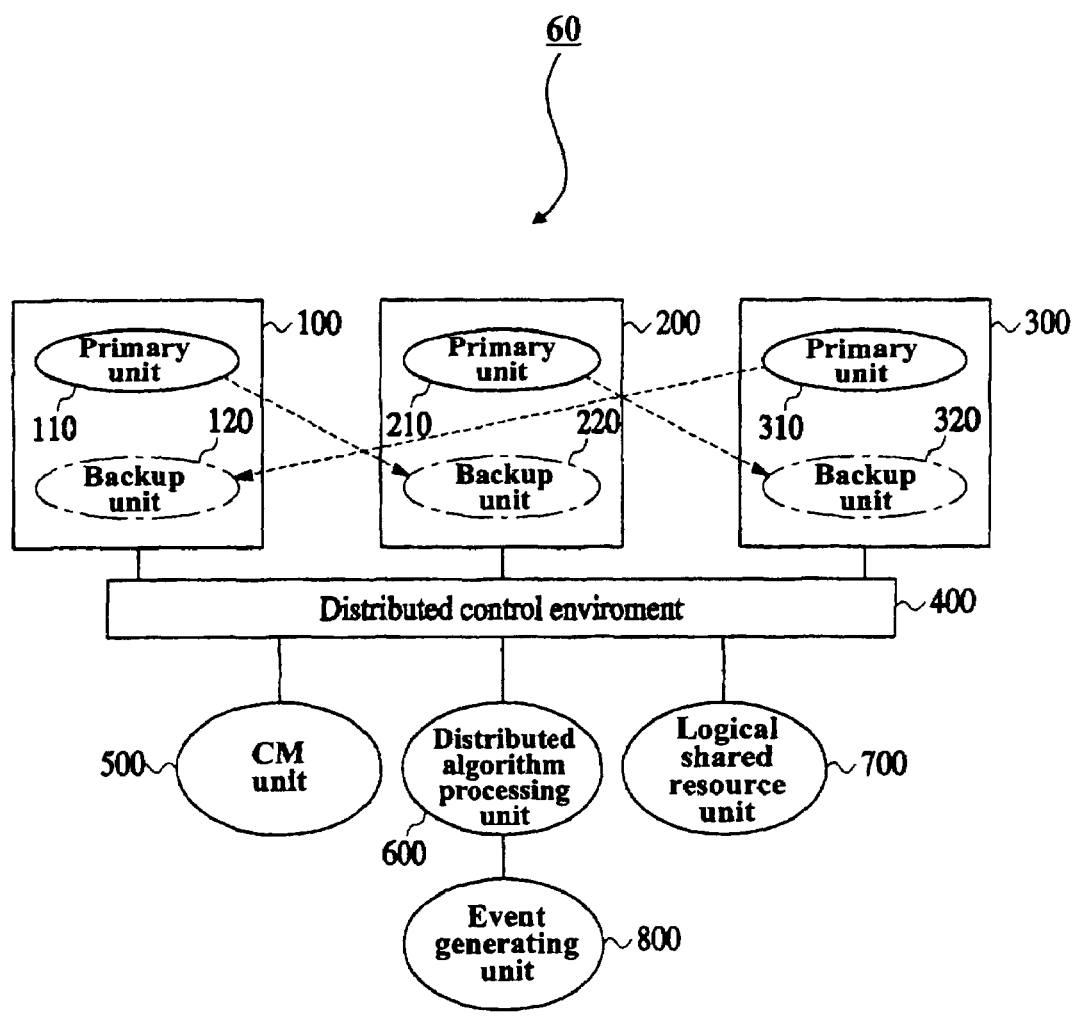
FIG. 2A is a conceptual diagram illustrating a distributed control system with both a load sharing structure and a primary/backup structure in accordance with one embodiment of the present invention.

Turning to FIG. 2A, FIG. 2A illustrates a distributed control system 60 having both a load sharing structure and a primary/backup structure in accordance with the one embodiment of the present invention. System 60 has three primary units 110, 210 and 310 disposed in sub-systems 100, 200 and 300 respectively. System 60 further has backup units 120, 220 and 320 disposed in sub-systems 100, 200 and 300 respectively. Backup units 120, 220 and 320 correspond to primary units 310, 110, and 210, respectively, as indicated by the arrows in FIG. 2A. System 60 further includes a distributed control environment 400 comprised of a middleware platform and being programmed and configured to convey data among the plurality of sub-systems, the configuration management unit, the distributed algorithm processing unit, and the shared resource unit.

Configuration management (CM) unit 500 generates the primary units 110, 210, and 310 and configures the backup units 120, 220, and 320. If a new sub-system is added, a primary unit 410 (not illustrated) is newly generated by the CM unit 500, and a new backup unit is reconfigured for the newly-generated primary unit 410 (not illustrated). CM unit 500 separately manages an index linking the backup units 120, 220, and 320 to the corresponding primary units 310, 110 and 210 respectively. CM unit 500 manages only the primary units 110, 210, and 310 and backup units 120, 220 and 320. CM unit 500 is not involved in generation of the events.

The logical shared resource unit 700 manages processing of the generated events. When a new event shared by the primary units 110, 210 and 310 is generated, the logical shared resource unit 700 is occupied by the primary units 110, 210 and 310. If the primary/backup structure of FIG. 2A is constructed and the new event is generated in the shared state with the logical shared resource unit 700, a process for processing the event in the primary units 110, 210 and 310, a process for continuously updating the backup units 120, 220 and 320, and a process for restoring the resources are carried out.

A primary designating method is determined by the distributed algorithm processing unit 600 using 1) a round robin method for distributing and designating the events, one event for each primary unit 110, 210 and 310 and 2) a method of distributing the events toward a least congested primary unit. Round robin means the first event is assigned to primary unit 110 for processing, the second event is assigned to primary unit 210, the third unit is assigned to primary unit 310, the fourth event is assigned to primary unit 110, and so on. The present invention will describe a distributing method in accordance with the distributed algorithm processing unit 600 as an example.

Figure 2B:
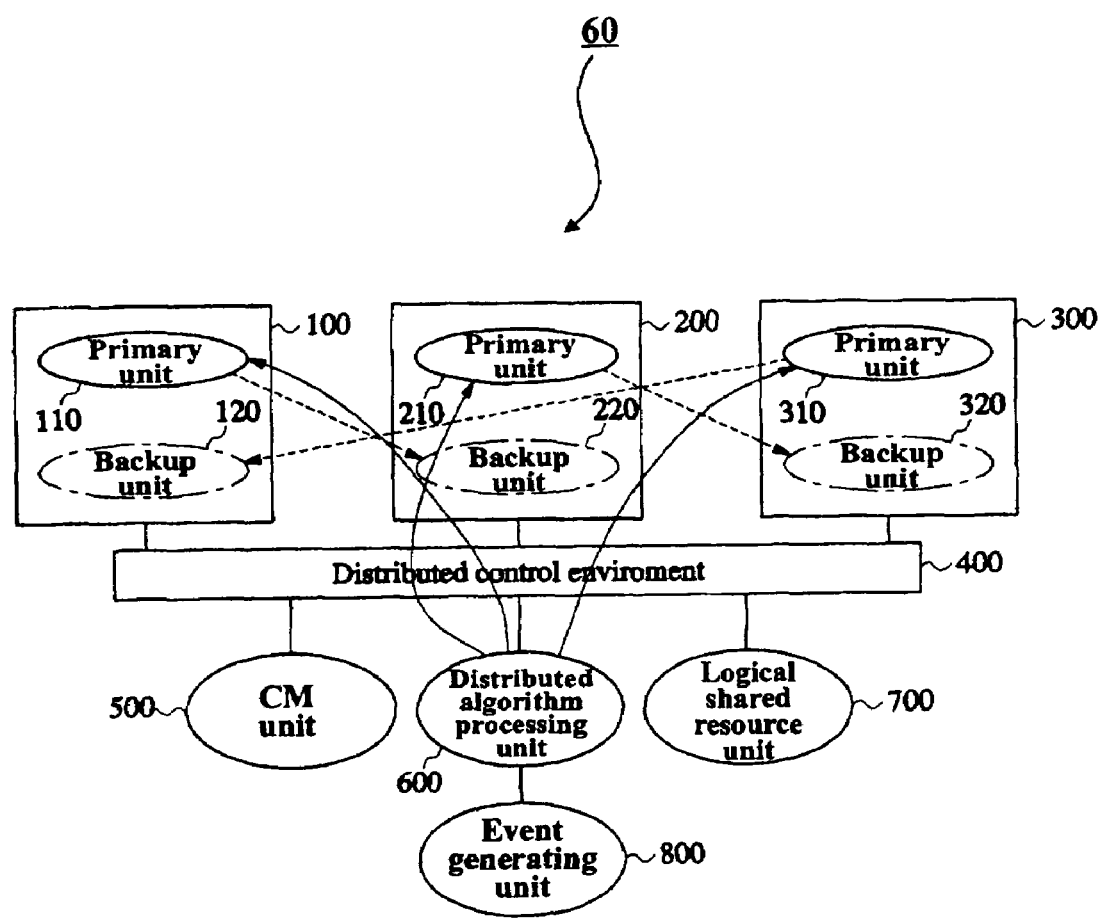
FIG. 2B is a block diagram illustrating a distributed control system with both a load sharing and backup setting relations when events are generated in a system of FIG. 2A.

Referring to FIG. 2B, suppose that a primary unit 110 is assigned to process certain events determined by the distributed algorithm processing unit 600. Primary unit 110 receives the certain assigned events from event generating unit 800 to occupy a necessary logical shared resource unit 700, and proceeds to process the events. Also, primary unit 110 informs a backup unit 220 of a sub-system 200 to maintain data needed to reconstruct and replicate the primary unit 110. Because duplication of all the data of primary unit 110 into backup unit 220 is laborious and not necessary, only a minimum data needed for restoration (e.g., an index for the events, an ongoing status, and occupied resources) is maintained in backup unit 220. When a new event is generated, it is distributed to the primary unit 210 and primary unit 310 by distributed algorithm processing unit 600. Also backup unit 320 and backup unit 120 keep a minimal amount of data necessary for restoration in an event that primary units 210 or 310 should fail.

Figure 3A:
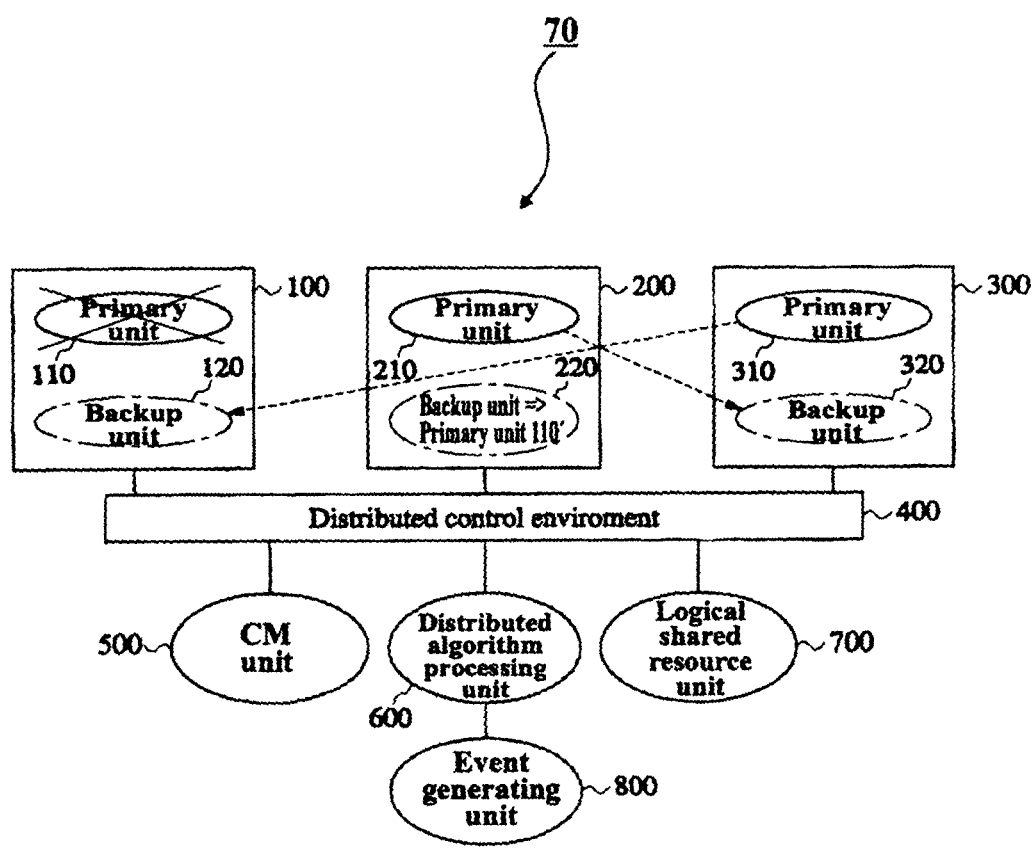
FIG. 3A is a block diagram illustrating a process of a specific backup unit being changed to a specific primary unit according to the relations of FIG. 2B when a specific primary unit malfunctions.
Figure 3B:
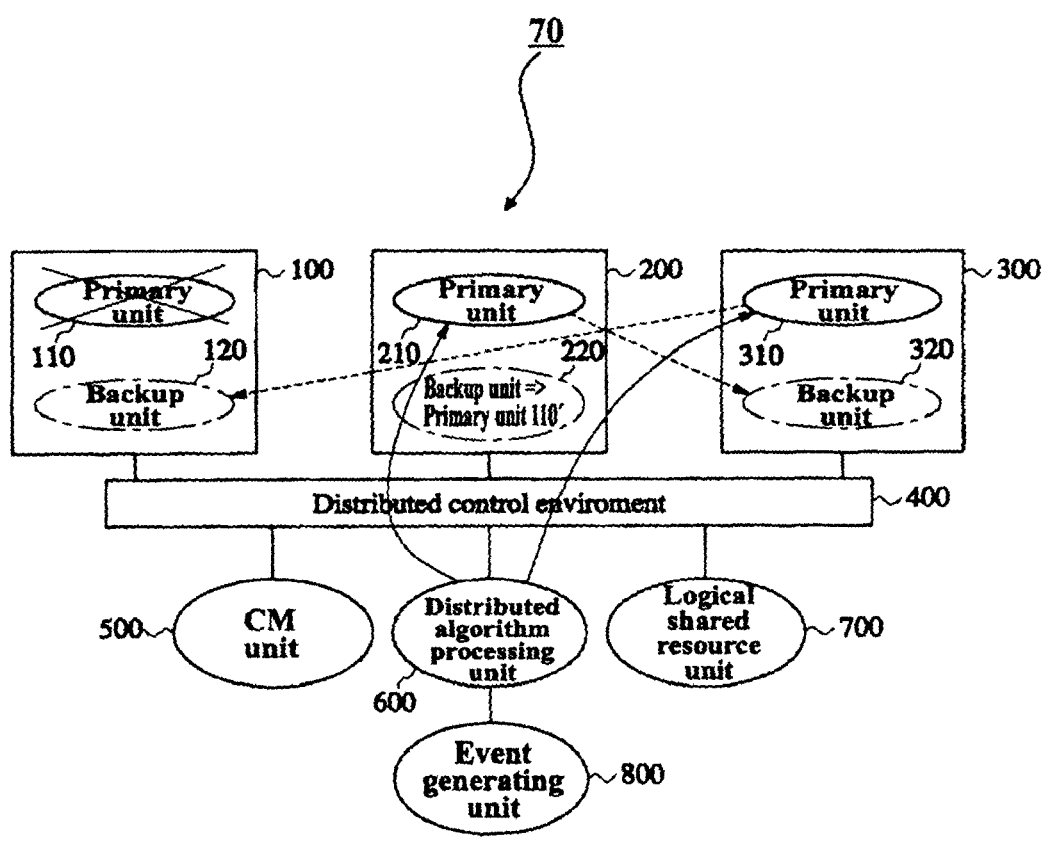
FIG. 3B is a block diagram illustrating load sharing processes of remaining primary units when a specific primary is malfunctioning according to the relations illustrated in FIG. 2B.

Turning to FIGS. 3A and 3B, FIGS. 3A and 3B illustrate a distributed control system 70 having three primary units and three backup units when one of the three primary units fails or malfunctions. When primary unit 110 fails, backup unit 220 takes over the processing of events formerly processed by primary unit 110. Therefore, backup unit 220 becomes a primary unit 110'. FIG. 3B illustrates a block diagram illustrating load sharing processes of remaining primary units 210 and 310 when primary unit 110 malfunctions according to the same relations illustrated in FIG. 2B.

As illustrated in FIG. 3A, when a primary unit 110 fails, backup unit 220 becomes primary unit 110' by a distributed control environment 400 and CM unit 500. At this time, the primary unit 110' continues processing events previously handled by primary unit 110. Primary unit 110' does not process any new events as primary 110' simply restores resources formally found in primary 110. If further events do not need to be processed, the function of the primary unit 110' terminates.

When a new event is generated, like illustrated in FIG. 3B, the CM unit 500 and the distributed control environment 400 designates primary units 210 and 310 to process the events and take over the processing load originally destined for primary unit 110. Even though primary unit 210 and primary unit 110' are both disposed in the same sub-system 200, the primary unit 110' is used only to process events originally designated to be processed by primary 110. Primary 110' does not participate in the load sharing with primary units 210 and 310. Thus, in the system 70 of FIG. 3B, if primary unit 110 fails and backup unit 220 becomes primary unit 110' which serves to replicate primary unit 110, primary unit 110 and primary unit 110' do not participate in the load sharing with primary units 210 and 310. Therefore, newly generated events generated when primary unit 110 is not working are processed only by primary units 210 and 310. When primary unit 110 should later be restored and become functional, primary unit 110' reverts back to becoming backup unit 220 and primary unit 110, having been restored, serves to load share with primary units 210 and 310.

Since the primary units 110, 210 and 310 perform load sharing processing according to the above process, the events can be processed uniformly among the three primary units where each of the three primary units shares the load in processing the events. As a result, there is no waste of resources. Moreover, it is possible to load share while providing a stable environment should one of the primary units should happen to malfunction.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

Like described so far, the present invention obtains advantages only separately supplied from a primary/backup structure and a load sharing structure, and the advantages are as follows: 1) there is no waste of resources since all existing systems are used, 2) it (the combined system) has good expandability by easily applying necessary systems, 3) it secures reliability with excellent economical efficiency, since maximum capacity can be obtained with a minimum system, 4) it can keep a data sharing function, an advantage of a distributed system as it is and 5) it keeps a primary/backup structure even with one system.

Summarizing the above advantages, the present invention processes generated events by distributing load and uses all available systems, thereby improving system capacity without a waste of resources as well as stably and efficiently operating the system by duplicating data with the use of a backup system.

While this invention has been particularly illustrated and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined by the appended claims.

What is claimed is:

1. A distributed control system, comprising:
a plurality of sub-systems, each sub-system comprising a primary unit and a backup unit, each primary unit being programmed and configured to process generated events;
a configuration management unit maintaining an index mapping backup units with corresponding primary units, each backup unit being adapted to complete processing of unfinished events started by a corresponding and malfunctioning primary unit and not to accept new events for processing;
a distributed algorithm processing unit being programmed and configured to assign generated events to a primary unit within a sub-system for processing; and
a logical shared resource unit being accessible by each primary unit from each sub-system in the processing of said generated events.

2. The system of claim 1, each backup unit storing a minimum amount of data needed to replicate a corresponding primary unit if the corresponding primary unit fails.

3. The system of claim 2, said backup units storing only an index of events, an ongoing status of the corresponding primary unit and information as to which resources are occupied.

4. The system of claim 1, the distributed algorithm processing unit being programmed and configured to assign generated events to various ones of said plurality of sub-systems in a round robin fashion.

5. The system of claim 1, the distributed algorithm processing unit being programmed and configured to assign newly generated events to a least congested sub-system for processing.

6. The system of claim 1, the configuration management unit and the distributed algorithm processing unit being programmed and configured to assign events only to functioning primary units and not to backup units.

7. The system of claim 1, the configuration management unit and the distributed algorithm processing unit are programmed and configured so that backup units do not participate in load sharing.

8. The system of claim 1, the configuration management unit being programmed and configured to manage process load sharing between the sub-systems.

9. The system of claim 1, each backup unit serves to duplicate a primary unit located in a different sub-system than the backup unit.

10. The system of claim 1, the component management unit and the distributed algorithm processing unit are programmed and configured to assign newly generated events to a primary unit in a sub-system that is least congested.

11. The system of claim 1, the configuration management unit being programmed and configured to generate a new primary unit and a new backup unit when a new sub-system is added to the system.

12. The system of claim 11, the configuration management unit being programmed and configured to reconfigure which primary units correspond to which backup units when a new sub-system is added to the system and a new primary unit and a new backup unit are generated.

13. The system of claim 1, wherein there is a one to one correspondence between primary units and backup units.

14. The system of claim 1, the system being configured to load share new events only between functioning primary units and not among functioning backup units processing for malfunctioning primary units.

15. A system combined with a load sharing structure and a primary/backup structure, the system having a plurality of sub-systems, the system comprising:
a primary unit disposed in each of said plurality of sub-systems to share an event processing work load according to a load sharing processing order for events;
a backup unit disposed in each of said plurality of sub-systems to receive and store only a minimum amount of data that is necessary for restoration from a primary unit in preparation for when a primary unit malfunctions, each backup unit corresponding to a respective primary unit, each backup unit being adapted to finish processing events already started by a corresponding malfunctioned primary unit;

a configuration management unit comprising an index mapping each backup unit with corresponding primary units, the configuration management unit being adapted to designate which backup unit is for each primary unit, the configuration management unit also being adapted to manage which backup unit corresponds to which primary unit;

a distributed algorithm processing unit being programmed and configured to determine which sub-system processes events when the events are generated;

a shared resource unit shared and used by each sub-system and used by the primary units;

an event generating unit being programmed and configured to generate events; and a distributed control environment comprised of a middleware platform and being programmed and configured to convey data among the plurality of sub-systems, the configuration management unit and the distributed control environment being configured to designate new events only to non-malfunctioning primary units and not to backup units processing for malfunctioning primary units.

16. The system of claim 15, each backup unit corresponds to a primary unit that is located in a different sub-system than the backup unit.

17. The system of claim 15, the configuration management unit comprising an index for processing load sharing between the primary units and comprising an index mapping each backup unit to a corresponding primary unit stored in the configuration management unit.

18. The system of claim 15, the distributed algorithm processing unit being programmed and configured to assign generated events in a round robin fashion to the primary units.

19. The system of claim 15, the distributed algorithm processing unit being programmed and configured to assign generated events to primary units that are the least congested.

20. The system of claim 15, the distributed algorithm processing unit being programmed and configured to calculate load sharing between the primary units and to assign a newly generated event to a primary unit based on said calculation.

* * * * *